United States Patent
Rodrigo et al.

(10) Patent No.: US 12,552,857 B2
(45) Date of Patent: Feb. 17, 2026

(54) METHOD FOR SEPARATION OF ANTIBODIES OR ANTIBODY FRAGMENTS BEING DEVOID OF AN Fc REGION CAPABLE OF BINDING TO PROTEIN A

(71) Applicant: Cytiva Bioprocess R&D AB, Uppsala (SE)

(72) Inventors: Gustav Rodrigo, Uppsala (SE); Mats Ander, Uppsala (SE); Tomas Bjorkman, Uppsala (SE); Ronnie Palmgren, Uppsala (SE); Charlotte Brink, Uppsala (SE)

(73) Assignee: Cytiva Bioprocess R&D AB, Uppsala (SE)

( * ) Notice: Subject to any disclaimer, the term of this patent is extended or adjusted under 35 U.S.C. 154(b) by 819 days.

(21) Appl. No.: 17/604,964

(22) PCT Filed: Apr. 29, 2020

(86) PCT No.: PCT/EP2020/061826
§ 371 (c)(1),
(2) Date: Oct. 19, 2021

(87) PCT Pub. No.: WO2020/221781
PCT Pub. Date: Nov. 5, 2020

(65) Prior Publication Data
US 2022/0315647 A1    Oct. 6, 2022

Related U.S. Application Data

(60) Provisional application No. 62/839,840, filed on Apr. 29, 2019.

(51) Int. Cl.
C07K 16/12    (2006.01)
C07K 1/22     (2006.01)
C07K 16/00    (2006.01)

(52) U.S. Cl.
CPC ............ C07K 16/1271 (2013.01); C07K 1/22 (2013.01); C07K 16/00 (2013.01); C07K 2317/55 (2013.01); C07K 2317/569 (2013.01); C07K 2317/622 (2013.01)

(58) Field of Classification Search
None
See application file for complete search history.

(56) References Cited

U.S. PATENT DOCUMENTS

2021/0087227 A1    3/2021    Rodrigo et al.

FOREIGN PATENT DOCUMENTS

| CN | 112940090 A | 6/2021 | |
|---|---|---|---|
| EP | 2412809 A1 | 1/2012 | |
| EP | 3521304 A1 | 8/2019 | |
| EP | 3757123 A1 | 12/2020 | |
| JP | 2017095503 A | 6/2017 | |
| WO | 0063243 A | 10/2000 | |
| WO | 2007097361 A1 | 8/2007 | |
| WO | 2009019117 A1 | 2/2009 | |
| WO | 2009/146755 A1 | 10/2009 | |
| WO | 2010110288 A1 | 9/2010 | |
| WO | WO 2017/194594 | * 11/2017 | ............. C07K 14/31 |
| WO | WO 2017194596 A1 | 11/2017 | |
| WO | 2017022759 A1 | 5/2018 | |
| WO | WO 2018215503 A1 | 11/2018 | |
| WO | 2020/068511 A1 | 4/2020 | |
| WO | 2023/046886 A1 | 3/2023 | |

OTHER PUBLICATIONS

Bouvet et al. 'Immunoglobulin Fab fragment-binding proteins.' International Journal of Immunopharmacology: 16(5-6):419-424, 1994.*
Graille M. et al. "Crystal Structure of a *Staphylococcus aureus* Protein A Domain Complexed with the Fab Fragment of a Human IgM Antibody: Structural basis for recognition of B-cell receptors and superantigen activity," Proceedings of the National Academy of Sciences, National Academy of Sciences, vol. 97, No. 10, May 9, 2000 pp. 5399-5404.
Gerald Platteau et al. "Purification of antibody fragments and single domain antibodies with Amsphere (TM) A3 Protein A resin," Oct. 5, 2017, pp. 1-12, retrieved from Internet: URL:https://pdfs.semanticscholar.org/cf0e/ff622fc5cbc1d278b298eeb4148b36dc8e41.pdf.
PCT International Search Report and Written Opinion for PCT/EP2020/061826 mailed Aug. 28, 2020 (14 pages).
International Search Report and Written Opinion of PCT/EP2023/056401, mailed Jul. 17, 2023 (20 pages).

(Continued)

*Primary Examiner* — Nora M Rooney
(74) *Attorney, Agent, or Firm* — Eversheds-Sutherland (US) LLP

(57) ABSTRACT

The invention discloses a method for separation of antibodies or antibody fragments, comprising the steps of: a) providing a feed comprising antibodies or antibody fragments having a VH3 region and being devoid of an Fc region capable of binding to Protein A; b) contacting the feed with a separation resin having covalently coupled ligands, wherein the ligands comprise a polypeptide as defined by SEQ ID NO 1 and wherein the antibodies or antibody fragments bind to the separation resin; c) optionally washing the separation resin with a washing liquid; d) eluting the antibodies or antibody fragments from the separation resin with an elution liquid and recovering the antibodies or antibody fragments.

20 Claims, 4 Drawing Sheets

Specification includes a Sequence Listing.

(56) References Cited

OTHER PUBLICATIONS

Michael D. Mclean, et al. "Purification of the therapeutic antibody trastuzumab from genetically modified plants using safflower Protein A-oleosin oilbody technology", Transgenic Research, Kluwer Academic Publishers—Plenum Publishers, NE, vol. 21, No. 6, Mar. 2, 2012 (Mar. 2, 2012), pp. 1291-1301.

Susanne Gülich, et al. "Protein engineering of an IgG-binding domain allows milder elution conditions during affinity chromatography", Journal of Biotechnology, Elsevier, Amsterdam NL, vol. 76, Jan. 1, 2000 (Jan. 1, 2000), pp. 233-244.

Therese A. Seldon, et al. "Improved Protein-A separation of VH3 Fab from FC after Papain Digestion of Antibodies" Chemical and Pharmaceutical Bulletin, Pharmaceutical Society of Japan, JP, vol. 34, No. 12, Dec. 1, 1986 (Dec. 1, 1986), pp. 5071-5078.

Martin Linhult, et al. "Improving the tolerance of a protein a analogue to repeated alkaline exposures using a bypass mutagenesis approach", Proteins: Structure, Function, and Bioinformatics, John Wiley & Sons, Inc, US, vol. 55, No. 2, May 1, 2004 (May 1, 2004), pp. 407-416.

Heikkinen, et al., "NMR Structure Determinations of Small Proteins Using Only One Fractionally 20% 13C– and Uniformly 100% 15N-Labeled Sample," Molecules, 26, 747, 2021.

Search Report Issued in GB Patent Application No. GB2203478.9, mailed Sep. 15, 2022. (5 pages).

First Office Action in corresponding JP Application No. 2021-564361, mailed Jun. 3, 2024 (8 pages).

Dai, Journal of Chromatography A, 2016, vol. 1463, pp. 81-89.

Bach, Journal of Chromatography A, 2015, vol. 1409, pp. 60-69.

Wang, International Journal of Clinical Experimental Medicine, 2017, vol. 10, No. 10, pp. 14244-14255.

* cited by examiner

METHOD FOR SEPARATION OF ANTIBODIES OR ANTIBODY FRAGMENTS BEING DEVOID OF AN Fc REGION CAPABLE OF BINDING TO PROTEIN A

CROSS REFERENCE TO RELATED APPLICATIONS

This application claims the priority benefit of PCT/EP2020/061826, filed on Apr. 29, 2020, which claims the benefit of U.S. Provisional Application No. 62/839,840, filed on Apr. 29, 2019, the entire contents of which are incorporated by reference herein.

TECHNICAL FIELD OF THE INVENTION

The present invention relates to separation of immunoglobulins, and more particularly to a method for separation of antibodies or antibody fragments which have a VH3 region and are devoid of an Fc region capable of binding to Protein A.

BACKGROUND OF THE INVENTION

Protein A affinity chromatography is extensively used for separation of immunoglobulins such as therapeutic antibodies. The Protein A ligands selectively bind to the Fc region of the immunoglobulins and thus allow for a highly efficient capture step. For antibody constructs lacking an Fc region, e.g. antibody fragments, or for immunoglobulins with Fc region variants that do not bind to Protein A, e.g. IgG3 or IgM, native Protein A can still be useful in that it also binds to the VH3 region of immunoglobulins. However, native Protein A is not stable under the alkaline cleaning conditions used in bioprocessing and alkali-stabilized Protein A variants normally have mutations that inhibit the VH3 interaction, see e.g. US20060194950, hereby incorporated by reference in its entirety. This document discusses the inhibition of the VH3 interaction by the G29A mutation in Protein A Fc-binding B domains used in the commercial product Mab Select™ SuRe. Alternative ligands capable of binding antibodies/fragments lacking an Fc region include Protein L, Protein G and camelid antibodies. They are however all highly sensitive to alkaline cleaning conditions.

Accordingly, there is a need for an affinity chromatography separation method of antibodies or antibody fragments which do not have an Fc region capable of binding to Protein A, using a separation resin withstanding alkaline cleaning.

SUMMARY OF THE INVENTION

One aspect of the invention is to provide a method for separation of antibodies or antibody fragments. This is achieved with a method comprising the steps of:

a) providing a feed comprising antibodies or antibody fragments having a VH3 region and being devoid of an Fc region capable of binding to Protein A;

b) contacting the feed with a separation resin having ligands covalently coupled to a support, wherein the ligands comprise a polypeptide as defined by SEQ ID NO 1

SEQ ID NO 1
AQX$_1$AFYEILX$_2$LPNLTEEQRX$_3$AFIQSLKDDPSVSKAILAEAKKLNX$_4$
AQ wherein:
X$_1$=E,K,Y,T,F,L,W,I,M,V,A,H or R,
X$_2$=H or K,
X$_3$=N or A, and
X$_4$=D, F, Y, W, K or R and wherein the antibodies or antibody fragments bind to the separation resin;

c) optionally washing the separation resin with a washing liquid; and d) eluting the antibodies or antibody fragments from the separation resin with an elution liquid and recovering the antibodies or antibody fragments.

One advantage is that the method allows for separation of antibodies/antibodies without an Fc region capable of binding to Protein A. A further advantage is that the ligands and the resin are alkali stable and withstand repeated cycles of cleaning with up to 2 M NaOH.

Further suitable embodiments of the invention are described in the dependent claims.

DRAWINGS

DEFINITIONS

Figure 1:
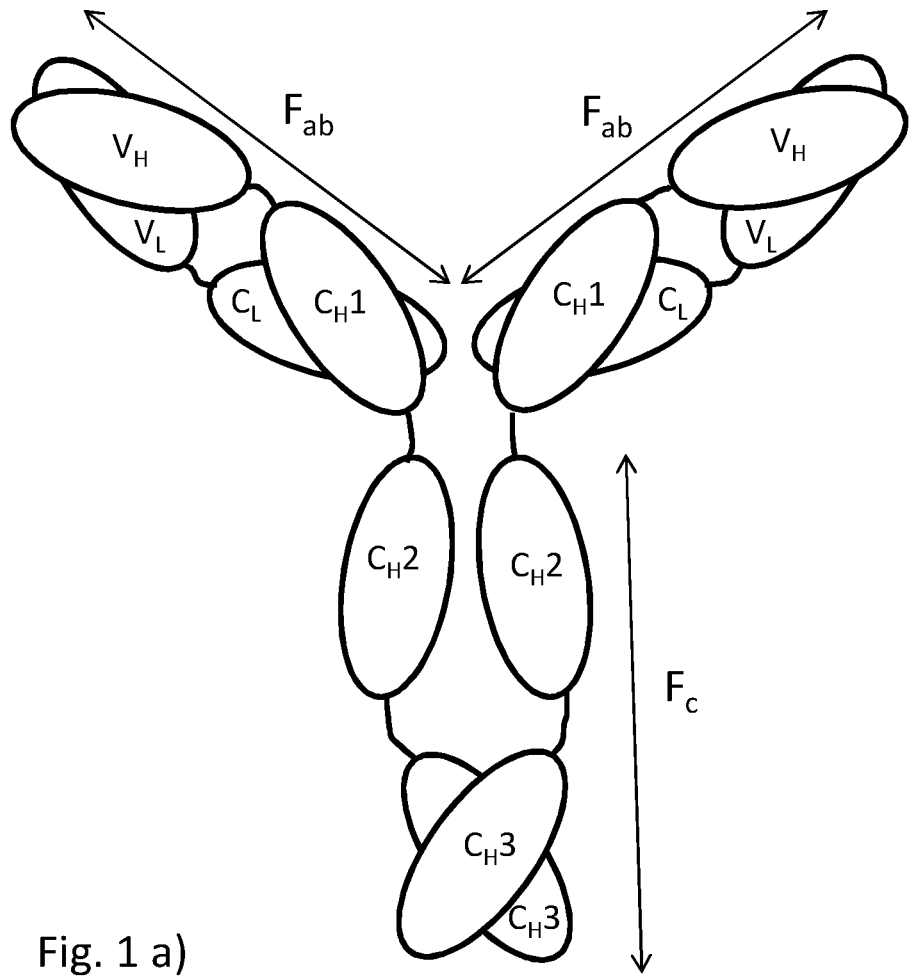
FIG. 1 shows the structure of a) a typical IgG antibody and b) a Fab fragment.
Figure 1:
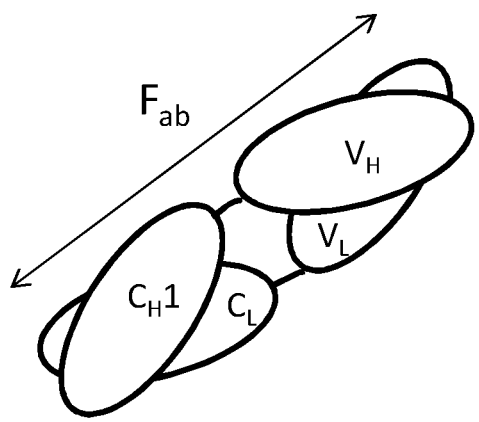

The terms "antibody" and "immunoglobulin" are used interchangeably herein, and are understood to include also fragments of antibodies, fusion proteins comprising antibodies or antibody fragments and conjugates comprising antibodies or antibody fragments.

The terms an "Fc-binding polypeptide" and "Fc-binding protein" mean a polypeptide or protein respectively, capable of binding to the crystallizable part (Fc) of an antibody and includes e.g. Protein A and Protein G, or any fragment or fusion protein thereof that has maintained said binding property.

The term "antibodies or antibody fragments devoid of an Fc region capable of binding to Protein A" herein means either antibodies or antibody fragments which lack an Fc region or antibodies/antibody fragments with an Fc region that does not bind to Protein A. Examples of antibodies/antibody fragments lacking an Fc region include Fab fragments, single-chain variable fragments (scFv), domain antibodies, nanobodies and bi-specific T-cell engagers (BiTe). Examples of antibodies with an Fc region not binding to Protein A include IgG3 antibodies, IgM antibodies, camelid V$_H$H single-domain antibodies and any antibodies with an Fc region engineered in such a way that it does not bind to Protein A. A practical test for whether a particular antibody/fragment has an Fc region capable of binding to Protein A or not is to load it on a column packed with the non-VH3-binding Protein A resin Mab Select™ SuRe (GE Healthcare), in a 20 mM phosphate, 500 mM NaCl, pH 7 loading buffer, washing the column with first the loading buffer and then with a 50 mM citrate pH6 wash buffer, and eluting the column with a 50 mM citrate pH 2.5 elution buffer. If the antibody/fragment does not have an Fc region capable of binding to Protein A, it will predominantly be found in the loading flowthrough and/or the wash buffers. If it has such an Fc region it will predominantly be found in the eluate.

The term "linker" herein means an element linking two polypeptide units, monomers or domains to each other in a multimer.

The term "spacer" herein means an element connecting a polypeptide or a polypeptide multimer to a support.

The term "% identity" with respect to comparisons of amino acid sequences is determined by standard alignment algorithms such as, for example, Basic Local Alignment Tool (BLAST™) described in Altshul et al. (1990) J. Mol. Biol., 215: 403-410. A web-based software for this is freely available from the US National Library of Medicine at http://blast.ncbi.nlm.nih.gov/
Blast.cgi?PROGRAM=blastp&PAGE
TYPE=BlastSearch&LINK LOC=blasthome . Here, the algorithm "blastp (protein-protein BLAST)" is used for alignment of a query sequence with a subject sequence and determining i.a. the % identity.

The term "native Protein A" herein means a polypeptide comprising the five native immunoglobulin-binding domains E,D,A,B,C directly linked to each other, as defined by SEQ ID NO. 31. The polypeptide may further comprise a leader sequence at the N-terminal end and a coupling element at the C-terminal or N-terminal end.

As used herein, the terms "comprises," "comprising," "containing," "having" and the like can have the meaning ascribed to them in U.S. Patent law and can mean "includes," "including," and the like; "consisting essentially of" or "consists essentially" likewise has the meaning ascribed in U.S. Patent law and the term is open-ended, allowing for the presence of more than that which is recited so long as basic or novel characteristics of that which is recited is not changed by the presence of more than that which is recited, but excludes prior art embodiments.

DETAILED DESCRIPTION OF EMBODIMENTS

In one aspect, the present invention discloses a method for separation of antibodies or antibody fragments which do not have an Fc region capable of binding to Staphylococcus Protein A. The method comprises the steps of:

a) Providing a feed, e.g. clarified cell culture supernatant, comprising antibodies or antibody fragments having a VH3 region and being devoid of an Fc region capable of binding to Protein A. In particular, the target species in the feed to separate can be antibody fragments having a VH3 region and being devoid of an Fc region. They can e.g. be selected from the group consisting of Fab, scFv, domain antibodies, nanobodies and BiTe: The target species in the feed to separate can also be antibodies having a VH3 region and an Fc region that does not bind to Protein A. They can e.g. be selected from the group consisting of IgG3, IgM and camelid $V_HH$ single-domain antibodies. Overall, the antibodies or antibody fragments can be capable of binding to native Protein A via the VH3 region. For non-Fc antibodies/fragments this can easily be tested by checking if they bind to the Mab Select™ or Mab Select Xtra resins (GE Healthcare), which comprise covalently coupled native Protein A ligands according to the definition above.

b) Contacting the feed with a separation resin having ligands covalently coupled to a support, wherein the ligands comprise a polypeptide as defined by or having at least 85%, such as at least 90% or at least 95% identity to SEQ ID NO 1

```
                                            SEQ ID NO 1
AQX₁AFYEILX₂LPNLTEEQRX₃AFIQSLKDDPSVSKAILAEAKKLNX₄
AQ
``` wherein:
$X_1$=E,K,Y,T,F,L,W,I,M,V,A,H or R,
$X_2$=H or K,
$X_3$=N or A, and
$X_4$=D, F, Y, W, K or R
and wherein the antibodies or antibody fragments bind to the separation resin. The binding strength of the antibodies or antibody fragments to the separation resin can be in the nanomolar range or stronger.

c) Optionally washing the separation resin with a washing liquid, to remove contaminants and/or impurities. The washing liquid can e.g. be a buffer of pH 5-7.

d) Eluting the antibodies or antibody fragments from the separation resin with an elution liquid and recovering the antibodies or antibody fragments. The elution liquid can suitably be a buffer of pH 2-5.

After step d), the method may further comprise a step e) of cleaning said separation resin with a cleaning liquid of pH 13 or higher. The cleaning liquid can comprise 0.1-2 M, such as 0.5-2 M, of an alkali metal hydroxide such as NaOH.

In some embodiments, steps a)-e) are repeated at least 50 times, such as at least 200 times.

In specific embodiments, $X_1$=E, $X_2$=H, $X_3$=N and/or $X_4$=D. Examples of such embodiments include:

```
                                            SEQ ID NO 2
AQEAFYEILHLPNLTEEQRNAFIQSLKDDPSVSKAILAEAKKLNDAQ;

SEQ ID NO 3
AQKAFYEILHLPNLTEEQRNAFIQSLKDDPSVSKAILAEAKKLNDAQ;

SEQ ID NO 4
AQEAFYEILKLPNLTEEQRNAFIQSLKDDPSVSKAILAEAKKLNDAQ;

SEQ ID NO 5
AQEAFYEILHLPNLTEEQRAAFIQSLKDDPSVSKAILAEAKKLNDAQ;
and
                                            SEQ ID NO 6
AQEAFYEILHLPNLTEEQRNAFIQSLKDDPSVSKAILAEAKKLNWAQ.
```

In some embodiments, the ligands comprise multimers of the polypeptide P. Such multimers can suitably be linked by linker regions L comprising 0-25 amino acid residues, such as 0-15 amino acid residues and may e.g. have a structure $(P-L)_{n-1}-P$ or $L-(P-L)_{n-1}-P$. The multimer can e.g. be a dimer, a trimer, a tetramer, a pentamer, a hexamer, a heptamer, an octamer or a nonamer. It can be a homomultimer, where all the units in the multimer are identical or it can be a heteromultimer, where at least one unit differs from the others. Advantageously, all the units in the multimer are alkali stable, such as by comprising the mutations disclosed above. The polypeptides can be linked to each other directly by peptide bonds between the C-terminal and N-terminal ends of the polypeptides. Alternatively, two or more units in the multimer can be linked by linkers comprising oligomeric or polymeric species, such as linkers comprising peptides with up to 25 or 30 amino acid residues, such as 3-25, 3-20 or 3-15 amino acid residues. The linkers may e.g. comprise or consist essentially of a peptide sequence defined by, or having at least 80%, at least 90% or at least 95% identity, with an amino acid sequence selected from the group consisting of APKVDAKFDKE, APKVDNKFNKE, APKADNKFNKE, APKVFDKE, APAKFDKE, AKFDKE, APKVDA, VDAKFDKE, APKKFDKE, APK, APKYEDGVDAKFDKE and YEDG or alternatively selected from the group consisting of APKADNKFNKE, APKVFDKE, APAKFDKE, AKFDKE, APKVDA, VDAKFDKE, APKKFDKE, APKYEDGVDAKFDKE and YEDG. They can also consist essentially of a peptide sequence defined by or having at least 80%, at least 90% or at least 95% identity with an amino acid sequence selected from the group consisting of APKADNKFNKE, APKVFDKE, APAKFDKE, AKFDKE, APKVDA, VDAKFDKE, APKKFDKE, APK and APKYEDGVDAKFDKE.

The nature of such a linker should preferably not destabilize the spatial conformation of the protein units. This can e.g. be achieved by avoiding the presence of proline in the linkers. Furthermore, the linker should preferably also be sufficiently stable in alkaline environments not to impair the properties of the mutated protein units. For this purpose, it is advantageous if the linkers do not contain asparagine. It can additionally be advantageous if the linkers do not contain glutamine. The multimer may further at the N-terminal end comprise a plurality of amino acid residues e.g. originating from the cloning process or constituting a residue from a cleaved off signaling sequence. The number of additional amino acid residues may e.g. be 20 or less, such as 15 or less, such as 10 or less or 5 or less. As a specific example, the multimer may comprise an AQ, AQGT, VDAKFDKE, AQVDAKFDKE or AQGTVDAKFDKE sequence at the N-terminal end (also called a leader sequence). The multimer can e.g. comprise or consist essentially of a sequence as defined by or having at least 80%, at least 90% or at least 95% identity with SEQ ID NO 7.

```
                                        SEQ ID NO 7
AQGT VDAKFDKEAQ EAFYEILHLP NLTEEQRNAF IQSLKDDPSV

SKAILAEAKK LNDAQAPK VDAKFDKEAQ EAFYEILHLP

NLTEEQRNAF IQSLKDDPSV SKAILAEAKK LNDAQAPK

VDAKFDKEAQ EAFYEILHLP NLTEEQRNAF IQSLKDDPSV

SKAILAEAKK LNDAQAPK VDAKFDKEAQ EAFYEILHLP

NLTEEQRNAF IQSLKDDPSV SKAILAEAKK LNDAQAPK

VDAKFDKEAQ EAFYEILHLP NLTEEQRNAF IQSLKDDPSV

SKAILAEAKK LNDAQAPK VDAKFDKEAQ EAFYEILHLP

NLTEEQRNAF IQSLKDDPSV SKAILAEAKK LNDAQAPKC
```

In some embodiments, the polypeptide and/or multimer, as disclosed above, further comprises at the C-terminal or N-terminal end one or more coupling elements, selected from the group consisting of one or more cysteine residues, a plurality of lysine residues and a plurality of histidine residues. The coupling element(s) may also be located within 1-5 amino acid residues, such as within 1-3 or 1-2 amino acid residues from the C-terminal or N-terminal end. The coupling element may e.g. be a single cysteine at the C-terminal end. The coupling element(s) may be directly linked to the C- or N-terminal end, or it/they may be linked via a stretch comprising up to 15 amino acids, such as 1-5, 1-10 or 5-10 amino acids. This stretch should preferably also be sufficiently stable in alkaline environments not to impair the properties of the mutated protein. For this purpose, it is advantageous if the stretch does not contain asparagine. It can additionally be advantageous if the stretch does not contain glutamine. An advantage of having a C-terminal cysteine is that endpoint coupling of the protein can be achieved through reaction of the cysteine thiol with an electrophilic group on a support. This provides excellent mobility of the coupled protein which is important for the binding capacity.

The polypeptides or multimers may be attached to the support via conventional coupling techniques utilizing e.g. thiol (in cysteine), amino (in lysine or the N-terminus) and/or carboxy (in aspartic or glutamic acid or the C-terminus) groups present in the ligand. Bisepoxides, epichlorohydrin, CNBr, N-hydroxysuccinimide (NHS) etc are well-known coupling reagents. Between the support and the polypeptide/multimer, a molecule known as a spacer can be introduced, which improves the availability of the polypeptide/multimer and facilitates the chemical coupling of the polypeptide/multimer to the support. Depending on the nature of the polypeptide/multimer and the coupling conditions, the coupling may be a multipoint coupling (e.g. via a plurality of lysines) or a single point coupling (e.g. via a single cysteine).

In certain embodiments the polypeptides or multimers are coupled to the support via thioether bonds. Methods for performing such coupling are well-known in this field and easily performed by the skilled person in this field using standard techniques and equipment. Thioether bonds are flexible and stable and generally suited for use in affinity chromatography. In particular when the thioether bond is via a terminal or near-terminal cysteine residue on the polypeptide or multimer, the mobility of the coupled polypeptide/multimer is enhanced which provides improved binding capacity and binding kinetics. In some embodiments the polypeptide/multimer is coupled via a C-terminal cysteine provided on the protein as described above. This allows for efficient coupling of the cysteine thiol to electrophilic groups, e.g. epoxide groups, halohydrin groups etc. on a support, resulting in a thioether bridge coupling.

In certain embodiments the support comprises a polyhydroxy polymer, such as a polysaccharide. Examples of polysaccharides include e.g. dextran, starch, cellulose, pullulan, agar, agarose etc. Polysaccharides are inherently hydrophilic with low degrees of nonspecific interactions, they provide a high content of reactive (activatable) hydroxyl groups and they are generally stable towards alkaline cleaning solutions used in bioprocessing.

In some embodiments the support comprises agar or agarose. The supports used in the present invention can easily be prepared according to standard methods, such as inverse suspension gelation (S Hjertén: Biochim Biophys Acta 79(2), 393-398 (1964). Alternatively, the base matrices are commercially available products, such as crosslinked agarose beads sold under the name of SEPHAROSE™ FF (GE Healthcare). In an embodiment, which is especially advantageous for large-scale separations, the support has been adapted to increase its rigidity using the methods described in U.S. Pat. Nos. 6,602,990 or 7,396,467, which are hereby incorporated by reference in their entireties, and hence renders the matrix more suitable for high flow rates.

In certain embodiments the support, such as a polymer, polysaccharide or agarose support, is crosslinked, such as with hydroxyalkyl ether crosslinks. Crosslinker reagents producing such crosslinks can be e.g. epihalohydrins like epichlorohydrin, diepoxides like butanediol diglycidyl ether, allylating reagents like allyl halides or allyl glycidyl ether. Crosslinking is beneficial for the rigidity of the support and improves the chemical stability. Hydroxyalkyl ether crosslinks are alkali stable and do not cause significant nonspecific adsorption.

In some embodiments, the solid support is in the form of a filter (e.g. a membrane or a depth filter matrix). In particular, the support can comprise one or more sheets or membranes of cellulose nanofibers, e.g. as described in U.S. 9,802,979, US20160288089 and PCT/EP2019/050227, hereby incorporated by reference in their entireties. The cellulose nanofibers can suitably be cross-linked for improvement of chemical and mechanical stability.

EXAMPLES

Example 1

Expression of Single Heavy-Chain Variable Domain ($V_HH$)

A single heavy-chain variable domain ($V_HH$) from a Camelidae origin also known as a Nanobody was expressed heterologous in *Escherichia coli* (*E. coli*). The $V_HH$ fragment was based on a sequence from K R Schmitz et al:, Structure 21, 1214-1224, (2013)

```
SEQ ID NO 23:
>4KRN:A|PDBID|CHAIN|SEQUENCE
QVQLQESGGGLVQPGGSLRLSCAASGRTFSSYAMGWFRQAPGKQREFVAA

IRWSGGYTYYTDSVKGRFTISRDNAKTTVYLQMNSLKPEDTAVYYCAATY

LSSDYSRYALPQRPLDYDYWGQGTQVTVSSLEHHHHHH
```

This sequence was modified for periplasmic expression by use of OmpA signal-peptide (*E. coli*, outer membrane protein A, UniProt P0A910) and a signal peptide cleavage site was introduced as the di-peptide AQ followed by an enzymatic restriction site for KpnI (amino acids VD). The final protein after processing of the signal-peptide had the sequence found in

```
SEQ ID NO 24:
AQVDQLQESGGGLVQPGGSLRLSCAASGRTFSSYAMGWFRQAPGKQREFV

AAIRWSGGYTYYTDSVKGRFTISRDNAKTTVYLQMNSLKPEDTAVYYCAA

TYLSSDYSRYALPQRPLDYDYWGQGTQVTVSSLEHHHHHH
```

This sequence was produced by DNA synthesis company ATUM (CA, USA) using proprietary codon optimization from *E. coli* expression and cloned into an expression vector (plasmid) containing an IPTG induced promoter. The plasmid was transformed into chemically competent *E. coli* K12 cells. The plasmid was dissolved in 25 mM Tris pH 8.5 to a concentration of 20 ng/μl of the plasmid was added to 50 μl of thawed competent cells on an ice bath and kept cold for 20 min. Followed by a heat shock at 42° C. for 60 s, followed by cooling on ice bath for 2 min. After the cells were chilled on ice 950 μl Luria broth (LB) was added and the cells were incubated in a shake-hood for 60 min at 225 rpm. After incubation, the cells were plated on Luria Agar (LA) plates with 100 μl on each plate and plates were incubated in an oven set to 37° C. over night. Following day, a single colony was picked and grown in LB to a final OD 600 nm of 1, followed by addition of 15% glycerol and frozen in −80° C. until further use. The frozen cell banks were thawed and 100 μl was used for inoculation of 100 mL Terrific Broth (TB) supplemented with 50 mg/L kanamycin and grown over night in 37° C. in a shake-hood. The following day, 10 mL of the over-night culture was used to inoculate 750 mL of fermentation media supplemented with 50 mg/L kanamycin. The culture was induced with a final concentration 1 mM IPTG when it reached 80 in optical density (OD), measured at 600 nm. The culture was kept at a constant temperature and pH for 12 h under aeration and agitation following induction. The fermentation was ended after 24 h and the cells were separated from the supernatant by centrifugation at 2500×g for 30 min. The supernatant was poured off and the cells were resuspended in 600 mL PBS and heat incubated at 48° C. for 3 h, to release periplasmic expressed protein. The heat treated suspension was centrifuged at 10 000×g for 30 min followed by sterile filtration using a 0.2 μm filter. The clarified supernatant was loaded onto a HiScale 16 column (GE Healthcare, Uppsala, Sweden) packed with 24 mL MabSelect™ resin (GE Healthcare, Uppsala, Sweden), equilibrated with 20 mM phosphate pH 7, 500 mM NaCl. The column was washed with 50 mM citrate pH 6 to reduce conductivity in the elution pool, followed by elution with 50 mM citrate pH 2.5. The purified $V_HH$ fragment had a concentration of 7.7 g/L in a 11 mL pool volume. The elution pool was adjusted to pH 7 by addition of 2 M tris base.

Example 2

VH3 Binding of a $V_HH$ Antibody Fragment on Different Chromatography Resins

Figure 2:
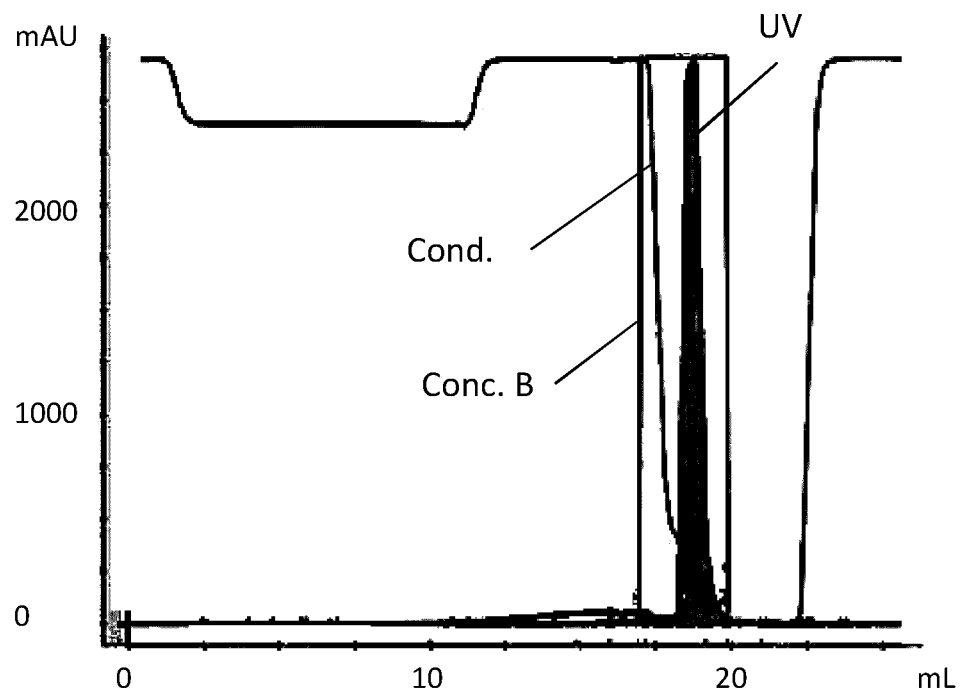
FIG. 2 shows chromatograms of 10 mg V$_H$H-EgAl on a) Mab Select Xtra; b) Mab Select SuRe; c) Prototype 1.
Figure 2:
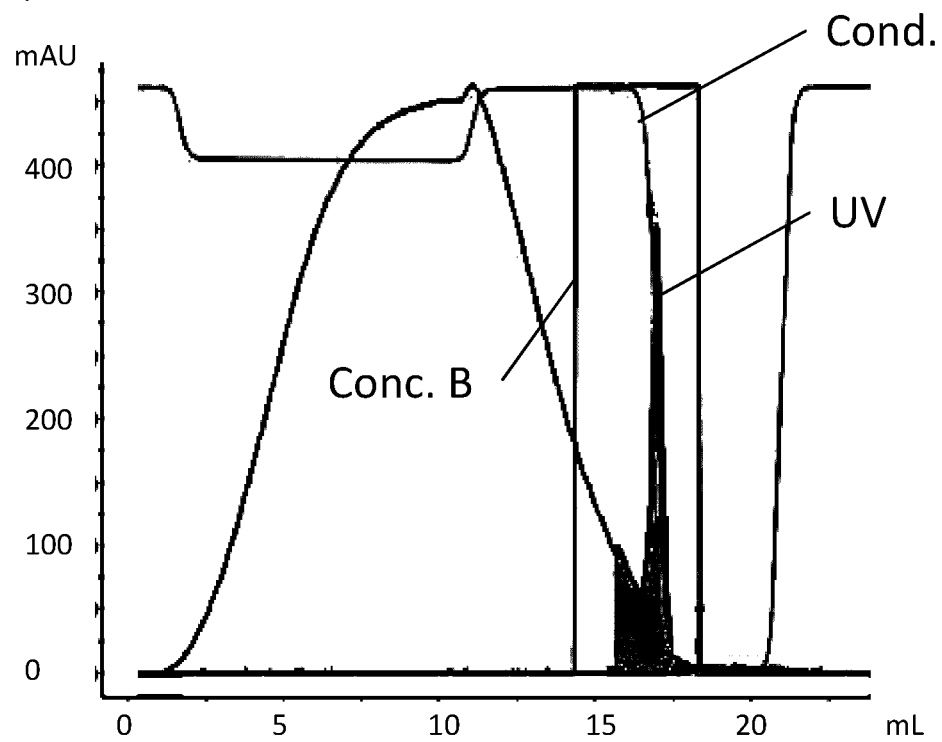
Figure 2:
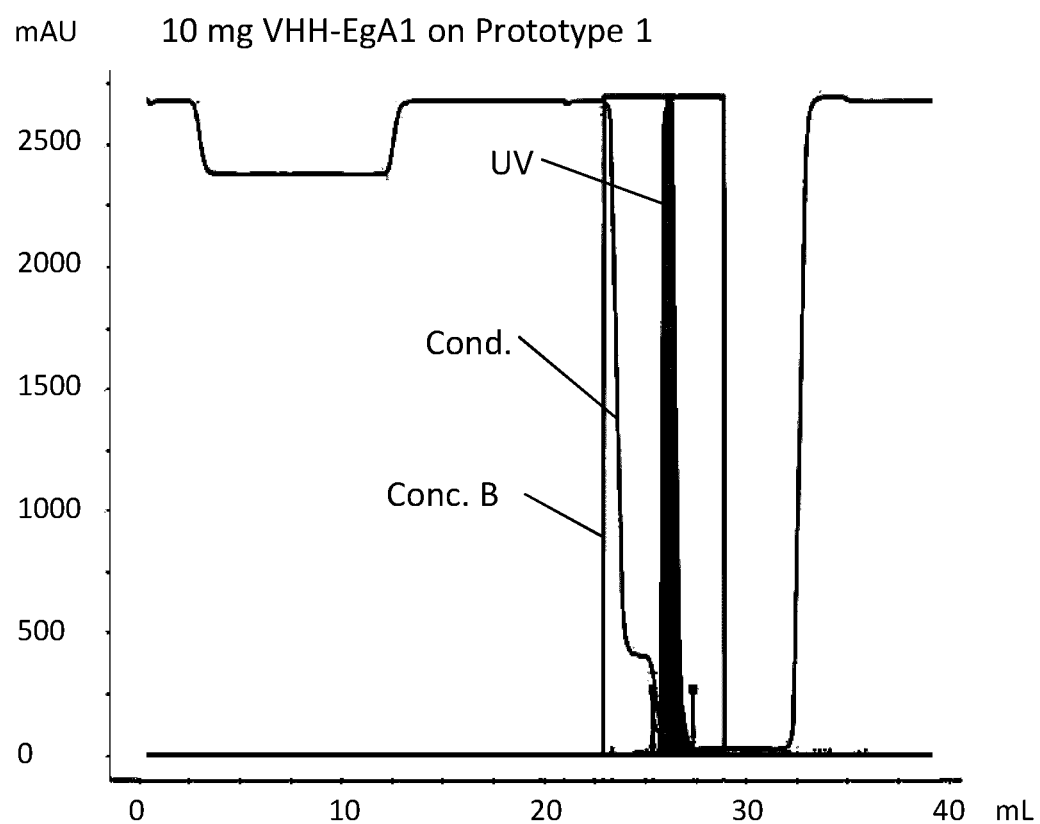
Figure 3:
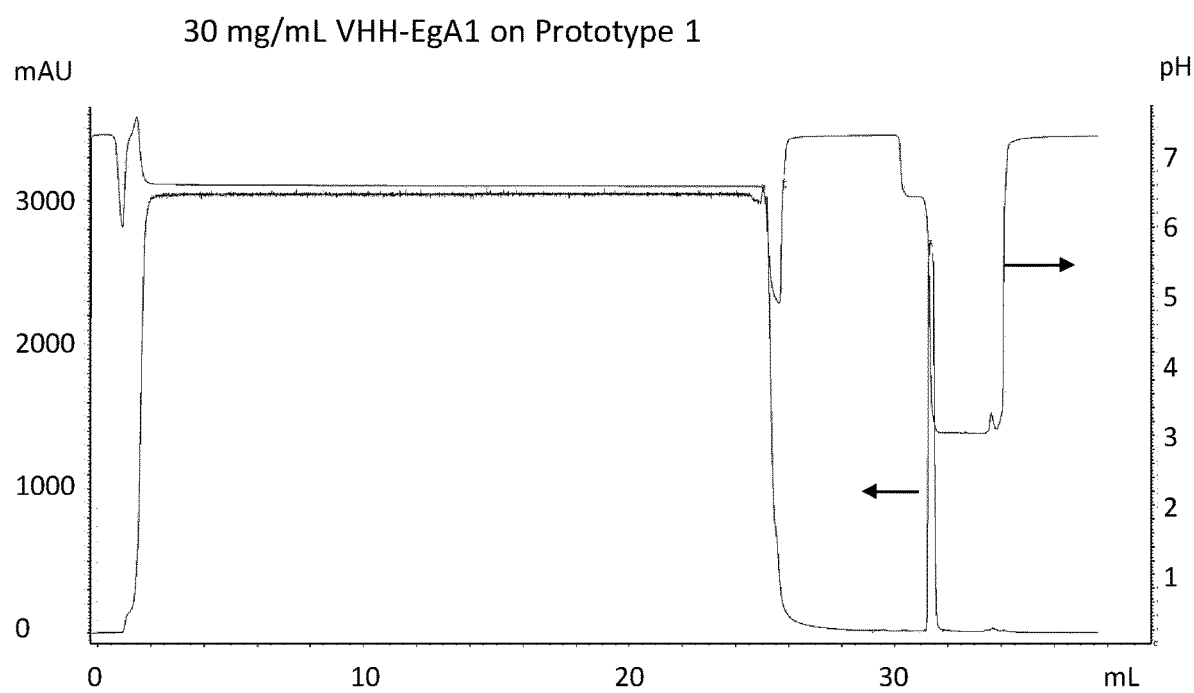
FIG. 3 shows a chromatogram of 30 mg/mL V$_H$H on Prototype 1.

The $V_HH$ fragment produced in example 1 was tested for binding to different chromatography resins, MabSelect™ Xtra (GE Healthcare, Uppsala, Sweden), MabSelect™ SuRe (GE Healthcare, Uppsala, Sweden) and Prototype 1: Highly crosslinked agarose beads of median bead diameter (d50,v) 57 μm coupled with the hexameric ligand of SEQ ID NO 7, according to the methods described in US20180094024, hereby incorporated by reference in its entirety. All experiments were performed using a ÄKTA Pure 150 FPLC system (GE Healthcare, Uppsala, Sweden). MabSelect™ Xtra and MabSelect™ SuRe was tested using prepacked 1 mL HiTrap™ columns (GE Healthcare, Uppsala, Sweden). Prototype 1 was packed in a Tricorn 5 column (GE Healthcare, Uppsala, Sweden) with a column volume (CV) of 1.94 mL. All chromatographic runs were performed using 20 mM phosphate, 500 mM NaCl, pH 7 as running buffer and a second was buffer consisting of 50 mM citrate pH 6, and 50 mM citrate pH 2.5 as elution buffer. To test binding to different resins, 10 mg $V_HH$ fragment produced in example 1 was diluted in 7 mL running buffer (20 mM phosphate pH 7, 500 mM NaCl) and loaded on a 1 mL Mabselect™ Xtra, SuRe or prototype 1 column. The results from the chromatography runs are shown in FIG. 2 a)-c). The $V_HH$ fragment bound to MabSelect™ Xtra column with a recovery of 73% and to prototype 1 with a recovery of 86%. However, the fragment bound very weakly to MabSelect™ SuRe resin with only 4% recovery, and most protein found in either loading or wash step. Furthermore, dynamic binding capacity for prototype 1 was measured for the $V_HH$ fragment by loading until 10% breakthrough was reached using 6 min residence time. A Tricorn 5/100 column was packed with prototype 1 to 1.98 mL CV. The capacity measurements were made with 20 mM Phosphate, 150 mM NaCl pH 7.4 as running buffer and elution buffer B with 50 mM Acetate pH 3.5. The column was regenerated between runs using 0.5 M NaOH. The $V_HH$ fragment was diluted to 2.3 mg/mL in 50 mL running buffer and filtrated with a Sterivex 0.22 μm filter. The final concentration was determined by UV measurements at 280 nm. The column was equilibrated at a flow rate of 1 mL/min before starting the run. The maximal absorbance of the sample was measured by running the sample in by-pass. The sample application was performed at a flow rate of 0.33 mL/min (6 min residence time) until the absorbance at 280 nm reached 10% of absorbance maximum. The washing step was performed at a flow rate of 1 mL/min for 10 CV followed by an isocratic elution with Buffer B. CIP was performed with 0.5 M NaOH at a flow rate of 1 mL/min during 3 CV. The peaks larger than 100 mAU were collected in chosen outlets. The dynamic binding capacity for prototype 1 resin was 36 mg/mL at 10% breakthrough ($Q_{B10}$) using 6 min residence time.

FIG. 2 a)
Column: MabSelect™ Xtra
Sample: 10 mg $V_HH$-EgA1 (SEQ ID NO 25)
Buffers: Start: 20 mM phosphate, 500 mM NaCl, pH 7
Wash 2: 50 mM citrate pH 6
Eluate: 50 mM citrate pH 2.5
FIG. 2 b)
Column: MabSelect™ SuRe
Sample: 10 mg $V_HH$-EgA1 (SEQ ID NO 25)
Buffers: Start: 20 mM phosphate, 500 mM NaCl, pH 7
Wash 2: 50 mM citrate pH 6
Eluate: 50 mM citrate pH 2.5
FIG. 2 c)
Column: Prototype 1
Sample: 10 mg $V_HH$-EgA1 (SEQ ID NO 25)
Buffers: Start: 20 mM phosphate, 500 mM NaCl, pH 7
Wash 2: 50 mM citrate pH 6
Eluate: 50 mM citrate pH 2.5

Example 3

VH3 Binding of a Fab

A VH3 type Fab was produced from a full length monoclonal antibody (mAb) by cleavage using papain. The mAb solution (54 ml, 1836 mg) was adjusted to pH 7.5 by addition of 2 M Tris base and then diluted 1:1 in digestion buffer (25 mM Na-phosphate, 1 mM EDTA, 5 mM mercaptoethanol, pH 7.5). Papain crystals were added to the solution (21 mg). The solution was incubated at 37° C. overnight. The following day, 400 µl of antipain (papain inhibitor) was added to the digested mAb. The solution was applied onto a HiScale 26/135 Capto L column (GE Healthcare, Uppsala, Sweden) to purify cleaved Fab fragments. The digested pool was loaded onto a Capto L column equilibrated with 25 mM Tris pH 8, followed by a second wash using 50 mM Na-citrate pH 5.0 and elution using 50 mM Na-citrate pH 2.3. The Fab was analyzed with SEC using a Superdex™ 200 Increase (GE Healthcare, Uppsala, Sweden) to verify full cleavage of mAb. The dynamic binding capacity for prototype 1 was measured for the Fab by loading until 10% breakthrough was reached using 6 min residence time. A Tricorn 5/100 column was packed with prototype 1 to 1.98 mL CV. The capacity measurements were made with 20 mM Phosphate, 150 mM NaCl pH 7.4 as running buffer and elution buffer B with 50 mM Acetate pH 3.5. The column was regenerated between runs using 0.5 M NaOH. The Fab was diluted to 2.25 mg/mL in 100 mL running buffer and filtered with a Sterivex 0.22 µm filter. The final concentration was determined by UV measurements at 280 nm. The column was equilibrated at a flow rate of 1 mL/min before starting the run. The maximal absorbance of the sample was measured by running the sample in by-pass. The sample application was performed at a flow rate of 0.33 mL/min (6 min residence time) until the absorbance at 280 nm reached 10% of absorbance maximum. The washing step was performed at a flow rate of 1 mL/min for 10 CV followed by an isocratic elution with Buffer B. CIP was performed with 0.5 M NaOH at a flow rate of 1 mL/min during 3 CV. The peaks larger than 100 mAU were collected in chosen outlets. The dynamic binding capacity for prototype 1 resin was 106 mg/mL at 10% breakthrough (QB 10) at 6 min residence time.

Example 4

Point Mutations in Single Heavy-Chain Variable Domain ($V_HH$) Fragment Sequence To test robustness of interaction between Protein A and single heavy-chain variable domain ($V_HH$) fragment a set of point mutations were made, followed by testing of retained affinity to MabSelect™ Xtra, SuRe and prototype 1. The $V_HH$ sequences were produced by DNA synthesis company ATUM (CA, USA) using proprietary codon optimization for *E. coli* expression and cloned into an expression vector (plasmid) containing an IPTG induced promoter. The plasmid was transformed into chemically competent *E. coli* K12 cells. The plasmid was dissolved in 25 mM Tris pH 8.5 to a concentration of 20 ng/µl. One µl of the plasmid was added to 50 µl of thawed competent cells on an ice bath and kept cold for 20 min. Then, a heat shock at 42° C. for 60 s was performed, followed by cooling on ice bath for 2 min. After the cells were chilled on ice 950 µl Luria broth (LB) was added and the cells were incubated in a shake-hood for 60 min at 225 rpm. After incubation, the cells were plated on Luria Agar (LA) plates with 100 µl on each plate and plates were incubated in an oven set to 37° C. over-night. The following day, a single colony was picked and grown in LB to a final OD 600 nm of 1, followed by addition of 15% glycerol and frozen in −80° C. until further use. The frozen cell banks were thawed and 500 µl was used for inoculation of 100 mL Terrific Broth (TB) supplemented with 50 mg/L kanamycin. The cultivation was grown in 37° C. until OD 600 nm reached 1, followed by induction with final concentration of 1 mM IPTG. Following induction, the cultivation was grown over-night at 37° C. and stopped the following morning by centrifugation at 2300×g, 20 min. The pellets were resuspended in 25 mM Tris-HCl, 500 mM NaCl pH 8.0, then sonicated (40% amplitude, 2 minutes, 5 seconds on/3 seconds off), centrifuged 10 000×g, 10 min and filtered through a 0.2 µm filter. The samples were then applied to MabSelect™ Xtra, MabSelect™ SuRe and Prototype 1 columns to verify binding. Flow-through fractions were collected until an elution peak was verified. If no peak was obtained, a Ni-Sepharose FF column (GE Healthcare, Uppsala, Sweden) was run on the flow-through fraction using 25 mM Tris pH 8.0 as running buffer and elution in a 5 CV gradient with 50 mM Tris, 250 mM Imidazole pH 8.0.

| Point mutation (According to Kabat nomenclature) | SEQ ID | MabSelect ™ Xtra binding | Prototype 1 binding | MabSelect ™ SuRe binding |
| --- | --- | --- | --- | --- |
| $V_HH$-EgA1 (T57K) | 25 | Y | Y | N |
| $V_HH$-EgA1 (T57K, K64R) | 26 | Y | Y | N |
| $V_HH$-EgA1 (T57P) | 27 | Y | Y | N |

-continued

| Point mutation (According to Kabat nomenclature) | SEQ ID | MabSelect ™ Xtra binding | Prototype 1 binding | MabSelect ™ SuRe binding |
|---|---|---|---|---|
| V$_H$H-EgA1 (T57S) | 28 | Y | Y | N |
| V$_H$H-EgA1 (T57R) | 29 | Y | Y | N |
| V$_H$H-EgA1 (S70T) | 30 | Y | Y | N |

Y = Yes, verified binding, N = No verified binding.
V$_H$H-EgA1 (T57K), SEQ ID NO 25
AQVDQLQESGGGLVQPGGSLRLSCAASGRTFSSYAMGWFRQAPGKQREFVAAIRWSG-
GYKYYTDSVKGRFTISRDNAKTTVYLQMNSLKPEDTAVYYCAATYLSSDYSRYALPQR-
PLDYDYWGQGTQVTVSSLEHHHHHH
V$_H$H-EgA1 (T57K, K64R), SEQ ID NO 26
AQVDQLQESGGGLVQPGGSLRLSCAASGRTFSSYAMGWFRQAPGKQREFVAAIRWSG-
GYKYYTDSVRGRFTISRDNAKTTVYLQMNSLKPEDTAVYYCAATYLSSDYSRYALPQR-
PLDYDYWGQGTQVTVSSLEHHHHHH
V$_H$H-EgA1 (T57P), SEQ ID NO 27
AQVDQLQESGGGLVQPGGSLRLSCAASGRTFSSYAMGWFRQAPGKQREFVAAIRWSGGY-
PYYTDSVKGRFTISRDNAKTTVYLQMNSLKPEDTAVYYCAATYLSSDYSRYALPQR-
PLDYDYWGQGTQVTVSSLEHHHHHH
V$_H$H-EgA1 (T57S), SEQ ID NO 28
AQVDQLQESGGGLVQPGGSLRLSCAASGRTFSSYAMGWFRQAPGKQREFVAAIRWSG-
GYSYYTDSVKGRFTISRDNAKTTVYLQMNSLKPEDTAVYYCAATYLSSDYSRYALPQR-
PLDYDYWGQGTQVTVSSLEHHHHHH
V$_H$H-EgA1 (T57R), SEQ ID NO 29
AQVDQLQESGGGLVQPGGSLRLSCAASGRTFSSYAMGWFRQAPGKQREFVAAIRWSG-
GYRYYTDSVKGRFTISRDNAKTTVYLQMNSLKPEDTAVYYCAATYLSSDYSRYALPQR-
PLDYDYWGQGTQVTVSSLEHHHHHH
V$_H$H-EgA1 (S70T), SEQ ID NO 30
AQVDQLQESGGGLVQPGGSLRLSCAASGRTFSSYAMGWFRQAPGKQREFVAAIRWSG-
GYTYYTDSVKGRFTITRDNAKTTVYLQMNSLKPEDTAVYYCAATYLSSDYSRYALPQR-
PLDYDYWGQGTQVTVSSLEHHHHHH This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All patents and patent applications mentioned in the text are hereby incorporated by reference in their entireties as if individually incorporated.

The invention claimed is:

1. A method for separation of antibodies or antibody fragments, comprising the steps of:
   a) providing a feed comprising antibodies or antibody fragments capable of binding to Protein A, where the antibodies or antibody fragments comprise a VH3 region and are devoid of an Fc region capable of binding to Protein A;
   b) contacting said feed with a separation resin having ligands covalently coupled to a support, wherein said ligands consist essentially of a polypeptide as defined by SEQ ID NO 1:

AQX$_1$AFYEILX$_2$LPNLTEEQRX$_3$AFIQSLKDDPSVSKAILAEAKKLNX$_4$ AQ wherein:
   X$_1$=E, K, Y, T, F, L, W, I, M, V, A, H or R,
   X$_2$=H or K,
   X$_3$=N or A, and
   X$_4$=D, F, Y, W, K or R and wherein said antibodies or antibody fragments bind to said separation resin;
   c) optionally washing said separation resin with a washing liquid; and
   d) eluting said antibodies or antibody fragments from said separation resin with an elution liquid and recovering said antibodies or antibody fragments.

2. The method of claim 1, wherein X$_1$=E.
3. The method of claim 1, wherein X$_2$=K.
4. The method of claim 1, wherein X$_3$=N.
5. The method of claim 1, wherein X$_4$=D.
6. The method of claim 1, wherein said ligands comprise multimers of said polypeptide, linked by linker regions comprising 0-15 amino acid residues.
7. The method of claim 6, wherein said multimers are tetramers, pentamers or hexamers.
8. The method of claim 6, wherein said multimers are coupled to said support via thioether links, derived from a C-terminal cysteine on said multimers.
9. The method of claim 1, wherein said support comprises crosslinked agarose beads.
10. The method of claim 1, wherein said support comprises crosslinked cellulose nanofibers.
11. The method of claim 1, wherein said feed is a clarified cell culture supernatant.
12. The method of claim 1, wherein said antibody fragments are selected from the group consisting of Fab, scFv, domain antibodies, nanobodies and BiTe.
13. The method of claim 1, wherein the binding strength of said antibody fragments to said separation resin is in the nanomolar range or stronger.
14. The method of claim 1, wherein said antibodies or antibody fragments are capable of binding to native Protein A via the VH3 region.
15. The method of claim 1, wherein the method comprises step c) and wherein contaminants and/or impurities are removed in step c).
16. The method of claim 15, wherein said washing liquid is a buffer of pH 5-7.
17. The method of claim 1, wherein said elution liquid is a buffer of pH 2-5.
18. The method of claim 1, further comprising, after step d), a step e) of cleaning said separation resin with a cleaning liquid of pH 13 or higher.
19. The method of claim 18, wherein said cleaning liquid comprises 0.5-2 M of an alkali metal hydroxide.
20. The method of claim 18, wherein steps a)-e) are repeated at least 50 times.

* * * * *

SEQUENCE LISTING

```
<160> NUMBER OF SEQ ID NOS: 31

<210> SEQ ID NO 1
<211> LENGTH: 47
<212> TYPE: PRT
<213> ORGANISM: Artificial Sequence
<220> FEATURE:
<223> OTHER INFORMATION: Ligand consensus sequence
<220> FEATURE:
<221> NAME/KEY: misc_feature
<222> LOCATION: (3)..(3)
<223> OTHER INFORMATION: Xaa can be any naturally occurring amino acid
<220> FEATURE:
<221> NAME/KEY: misc_feature
<222> LOCATION: (10)..(10)
<223> OTHER INFORMATION: Xaa can be any naturally occurring amino acid
<220> FEATURE:
<221> NAME/KEY: misc_feature
<222> LOCATION: (20)..(20)
<223> OTHER INFORMATION: Xaa can be any naturally occurring amino acid
<220> FEATURE:
<221> NAME/KEY: misc_feature
<222> LOCATION: (45)..(45)
<223> OTHER INFORMATION: Xaa can be any naturally occurring amino acid

<400> SEQUENCE: 1

Ala Gln Xaa Ala Phe Tyr Glu Ile Leu Xaa Leu Pro Asn Leu Thr Glu
1               5                   10                  15

Glu Gln Arg Xaa Ala Phe Ile Gln Ser Leu Lys Asp Asp Pro Ser Val
            20                  25                  30
```

Ser Lys Ala Ile Leu Ala Glu Ala Lys Lys Leu Asn Xaa Ala Gln
        35                  40                  45

<210> SEQ ID NO 2
<211> LENGTH: 47
<212> TYPE: PRT
<213> ORGANISM: Artificial Sequence
<220> FEATURE:
<223> OTHER INFORMATION: Ligand example

<400> SEQUENCE: 2

Ala Gln Glu Ala Phe Tyr Glu Ile Leu His Leu Pro Asn Leu Thr Glu
1               5                   10                  15

Glu Gln Arg Asn Ala Phe Ile Gln Ser Leu Lys Asp Asp Pro Ser Val
            20                  25                  30

Ser Lys Ala Ile Leu Ala Glu Ala Lys Lys Leu Asn Asp Ala Gln
        35                  40                  45

<210> SEQ ID NO 3
<211> LENGTH: 47
<212> TYPE: PRT
<213> ORGANISM: Artificial Sequence
<220> FEATURE:
<223> OTHER INFORMATION: Ligand example

<400> SEQUENCE: 3

Ala Gln Lys Ala Phe Tyr Glu Ile Leu His Leu Pro Asn Leu Thr Glu
1               5                   10                  15

Glu Gln Arg Asn Ala Phe Ile Gln Ser Leu Lys Asp Asp Pro Ser Val
            20                  25                  30

Ser Lys Ala Ile Leu Ala Glu Ala Lys Lys Leu Asn Asp Ala Gln
        35                  40                  45

<210> SEQ ID NO 4
<211> LENGTH: 47
<212> TYPE: PRT
<213> ORGANISM: Artificial Sequence
<220> FEATURE:
<223> OTHER INFORMATION: Ligand example

<400> SEQUENCE: 4

Ala Gln Glu Ala Phe Tyr Glu Ile Leu Lys Leu Pro Asn Leu Thr Glu
1               5                   10                  15

Glu Gln Arg Asn Ala Phe Ile Gln Ser Leu Lys Asp Asp Pro Ser Val
            20                  25                  30

Ser Lys Ala Ile Leu Ala Glu Ala Lys Lys Leu Asn Asp Ala Gln
        35                  40                  45

<210> SEQ ID NO 5
<211> LENGTH: 47
<212> TYPE: PRT
<213> ORGANISM: Artificial Sequence
<220> FEATURE:
<223> OTHER INFORMATION: Ligand example

<400> SEQUENCE: 5

Ala Gln Glu Ala Phe Tyr Glu Ile Leu His Leu Pro Asn Leu Thr Glu
1               5                   10                  15

Glu Gln Arg Ala Ala Phe Ile Gln Ser Leu Lys Asp Asp Pro Ser Val
            20                  25                  30

Ser Lys Ala Ile Leu Ala Glu Ala Lys Lys Leu Asn Asp Ala Gln
        35                  40                  45

```
<210> SEQ ID NO 6
<211> LENGTH: 47
<212> TYPE: PRT
<213> ORGANISM: Artificial Sequence
<220> FEATURE:
<223> OTHER INFORMATION: Ligand example

<400> SEQUENCE: 6

Ala Gln Glu Ala Phe Tyr Glu Ile Leu His Leu Pro Asn Leu Thr Glu
1               5                   10                  15

Glu Gln Arg Asn Ala Phe Ile Gln Ser Leu Lys Asp Asp Pro Ser Val
            20                  25                  30

Ser Lys Ala Ile Leu Ala Glu Ala Lys Lys Leu Asn Trp Ala Gln
        35                  40                  45

<210> SEQ ID NO 7
<211> LENGTH: 352
<212> TYPE: PRT
<213> ORGANISM: Artificial Sequence
<220> FEATURE:
<223> OTHER INFORMATION: Hexameric ligand

<400> SEQUENCE: 7

Ala Gln Gly Thr Val Asp Ala Lys Phe Asp Lys Glu Ala Gln Glu Ala
1               5                   10                  15

Phe Tyr Glu Ile Leu His Leu Pro Asn Leu Thr Glu Glu Gln Arg Asn
            20                  25                  30

Ala Phe Ile Gln Ser Leu Lys Asp Asp Pro Ser Val Ser Lys Ala Ile
        35                  40                  45

Leu Ala Glu Ala Lys Lys Leu Asn Asp Ala Gln Ala Pro Lys Val Asp
    50                  55                  60

Ala Lys Phe Asp Lys Glu Ala Gln Glu Ala Phe Tyr Glu Ile Leu His
65                  70                  75                  80

Leu Pro Asn Leu Thr Glu Glu Gln Arg Asn Ala Phe Ile Gln Ser Leu
                85                  90                  95

Lys Asp Asp Pro Ser Val Ser Lys Ala Ile Leu Ala Glu Ala Lys Lys
            100                 105                 110

Leu Asn Asp Ala Gln Ala Pro Lys Val Asp Ala Lys Phe Asp Lys Glu
        115                 120                 125

Ala Gln Glu Ala Phe Tyr Glu Ile Leu His Leu Pro Asn Leu Thr Glu
    130                 135                 140

Glu Gln Arg Asn Ala Phe Ile Gln Ser Leu Lys Asp Asp Pro Ser Val
145                 150                 155                 160

Ser Lys Ala Ile Leu Ala Glu Ala Lys Lys Leu Asn Asp Ala Gln Ala
                165                 170                 175

Pro Lys Val Asp Ala Lys Phe Asp Lys Glu Ala Gln Glu Ala Phe Tyr
            180                 185                 190

Glu Ile Leu His Leu Pro Asn Leu Thr Glu Glu Gln Arg Asn Ala Phe
        195                 200                 205

Ile Gln Ser Leu Lys Asp Asp Pro Ser Val Ser Lys Ala Ile Leu Ala
    210                 215                 220

Glu Ala Lys Lys Leu Asn Asp Ala Gln Ala Pro Lys Val Asp Ala Lys
225                 230                 235                 240

Phe Asp Lys Glu Ala Gln Glu Ala Phe Tyr Glu Ile Leu His Leu Pro
                245                 250                 255

Asn Leu Thr Glu Glu Gln Arg Asn Ala Phe Ile Gln Ser Leu Lys Asp
```

```
                  260                 265                 270
Asp Pro Ser Val Ser Lys Ala Ile Leu Ala Glu Ala Lys Lys Leu Asn
            275                 280                 285

Asp Ala Gln Ala Pro Lys Val Asp Ala Lys Phe Asp Lys Glu Ala Gln
        290                 295                 300

Glu Ala Phe Tyr Glu Ile Leu His Leu Pro Asn Leu Thr Glu Glu Gln
305                 310                 315                 320

Arg Asn Ala Phe Ile Gln Ser Leu Lys Asp Asp Pro Ser Val Ser Lys
                325                 330                 335

Ala Ile Leu Ala Glu Ala Lys Lys Leu Asn Asp Ala Gln Ala Pro Lys
            340                 345                 350
```

<210> SEQ ID NO 8
<211> LENGTH: 11
<212> TYPE: PRT
<213> ORGANISM: Artificial Sequence
<220> FEATURE:
<223> OTHER INFORMATION: Linker

<400> SEQUENCE: 8

```
Ala Pro Lys Val Asp Ala Lys Phe Asp Lys Glu
1               5                   10
```

<210> SEQ ID NO 9
<211> LENGTH: 11
<212> TYPE: PRT
<213> ORGANISM: Artificial Sequence
<220> FEATURE:
<223> OTHER INFORMATION: Linker

<400> SEQUENCE: 9

```
Ala Pro Lys Val Asp Asn Lys Phe Asn Lys Glu
1               5                   10
```

<210> SEQ ID NO 10
<211> LENGTH: 11
<212> TYPE: PRT
<213> ORGANISM: Artificial Sequence
<220> FEATURE:
<223> OTHER INFORMATION: Linker

<400> SEQUENCE: 10

```
Ala Pro Lys Ala Asp Asn Lys Phe Asn Lys Glu
1               5                   10
```

<210> SEQ ID NO 11
<211> LENGTH: 8
<212> TYPE: PRT
<213> ORGANISM: Artificial Sequence
<220> FEATURE:
<223> OTHER INFORMATION: Linker

<400> SEQUENCE: 11

```
Ala Pro Lys Val Phe Asp Lys Glu
1               5
```

<210> SEQ ID NO 12
<211> LENGTH: 8
<212> TYPE: PRT
<213> ORGANISM: Artificial Sequence
<220> FEATURE:
<223> OTHER INFORMATION: Linker

<400> SEQUENCE: 12

```
Ala Pro Ala Lys Phe Asp Lys Glu
1               5

<210> SEQ ID NO 13
<211> LENGTH: 6
<212> TYPE: PRT
<213> ORGANISM: Artificial Sequence
<220> FEATURE:
<223> OTHER INFORMATION: Linker

<400> SEQUENCE: 13

Ala Lys Phe Asp Lys Glu
1               5

<210> SEQ ID NO 14
<211> LENGTH: 6
<212> TYPE: PRT
<213> ORGANISM: Artificial Sequence
<220> FEATURE:
<223> OTHER INFORMATION: Linker

<400> SEQUENCE: 14

Ala Pro Lys Val Asp Ala
1               5

<210> SEQ ID NO 15
<211> LENGTH: 8
<212> TYPE: PRT
<213> ORGANISM: Artificial Sequence
<220> FEATURE:
<223> OTHER INFORMATION: Linker

<400> SEQUENCE: 15

Val Asp Ala Lys Phe Asp Lys Glu
1               5

<210> SEQ ID NO 16
<211> LENGTH: 8
<212> TYPE: PRT
<213> ORGANISM: Artificial Sequence
<220> FEATURE:
<223> OTHER INFORMATION: Linker

<400> SEQUENCE: 16

Ala Pro Lys Lys Phe Asp Lys Glu
1               5

<210> SEQ ID NO 17
<211> LENGTH: 15
<212> TYPE: PRT
<213> ORGANISM: Artificial Sequence
<220> FEATURE:
<223> OTHER INFORMATION: Linker

<400> SEQUENCE: 17

Ala Pro Lys Tyr Glu Asp Gly Val Asp Ala Lys Phe Asp Lys Glu
1               5                   10                  15

<210> SEQ ID NO 18
<211> LENGTH: 4
<212> TYPE: PRT
<213> ORGANISM: Artificial Sequence
<220> FEATURE:
<223> OTHER INFORMATION: Linker

<400> SEQUENCE: 18

Tyr Glu Asp Gly
```

```
<210> SEQ ID NO 19
<211> LENGTH: 4
<212> TYPE: PRT
<213> ORGANISM: Artificial Sequence
<220> FEATURE:
<223> OTHER INFORMATION: Leader

<400> SEQUENCE: 19

Ala Gln Gly Thr
1

<210> SEQ ID NO 20
<211> LENGTH: 8
<212> TYPE: PRT
<213> ORGANISM: Artificial Sequence
<220> FEATURE:
<223> OTHER INFORMATION: Leader

<400> SEQUENCE: 20

Val Asp Ala Lys Phe Asp Lys Glu
1               5

<210> SEQ ID NO 21
<211> LENGTH: 10
<212> TYPE: PRT
<213> ORGANISM: Artificial Sequence
<220> FEATURE:
<223> OTHER INFORMATION: Leader

<400> SEQUENCE: 21

Ala Gln Val Asp Ala Lys Phe Asp Lys Glu
1               5                   10

<210> SEQ ID NO 22
<211> LENGTH: 12
<212> TYPE: PRT
<213> ORGANISM: Artificial Sequence
<220> FEATURE:
<223> OTHER INFORMATION: Leader

<400> SEQUENCE: 22

Ala Gln Gly Thr Val Asp Ala Lys Phe Asp Lys Glu
1               5                   10

<210> SEQ ID NO 23
<211> LENGTH: 138
<212> TYPE: PRT
<213> ORGANISM: Artificial Sequence
<220> FEATURE:
<223> OTHER INFORMATION: VHH

<400> SEQUENCE: 23

Gln Val Gln Leu Gln Glu Ser Gly Gly Gly Leu Val Gln Pro Gly Gly
1               5                   10                  15

Ser Leu Arg Leu Ser Cys Ala Ala Ser Gly Arg Thr Phe Ser Ser Tyr
            20                  25                  30

Ala Met Gly Trp Phe Arg Gln Ala Pro Gly Lys Gln Arg Glu Phe Val
        35                  40                  45

Ala Ala Ile Arg Trp Ser Gly Gly Tyr Thr Tyr Tyr Thr Asp Ser Val
    50                  55                  60

Lys Gly Arg Phe Thr Ile Ser Arg Asp Asn Ala Lys Thr Thr Val Tyr
65                  70                  75                  80
```

```
Leu Gln Met Asn Ser Leu Lys Pro Glu Asp Thr Ala Val Tyr Tyr Cys
                85                  90                  95

Ala Ala Thr Tyr Leu Ser Ser Asp Tyr Ser Arg Tyr Ala Leu Pro Gln
            100                 105                 110

Arg Pro Leu Asp Tyr Asp Tyr Trp Gly Gln Gly Thr Gln Val Thr Val
        115                 120                 125

Ser Ser Leu Glu His His His His His
130                 135

<210> SEQ ID NO 24
<211> LENGTH: 140
<212> TYPE: PRT
<213> ORGANISM: Artificial Sequence
<220> FEATURE:
<223> OTHER INFORMATION: VHH-EgA1

<400> SEQUENCE: 24

Ala Gln Val Asp Gln Leu Gln Glu Ser Gly Gly Gly Leu Val Gln Pro
1               5                   10                  15

Gly Gly Ser Leu Arg Leu Ser Cys Ala Ala Ser Gly Arg Thr Phe Ser
            20                  25                  30

Ser Tyr Ala Met Gly Trp Phe Arg Gln Ala Pro Gly Lys Gln Arg Glu
        35                  40                  45

Phe Val Ala Ala Ile Arg Trp Ser Gly Gly Tyr Thr Tyr Tyr Thr Asp
    50                  55                  60

Ser Val Lys Gly Arg Phe Thr Ile Ser Arg Asp Asn Ala Lys Thr Thr
65                  70                  75                  80

Val Tyr Leu Gln Met Asn Ser Leu Lys Pro Glu Asp Thr Ala Val Tyr
                85                  90                  95

Tyr Cys Ala Ala Thr Tyr Leu Ser Ser Asp Tyr Ser Arg Tyr Ala Leu
            100                 105                 110

Pro Gln Arg Pro Leu Asp Tyr Asp Tyr Trp Gly Gln Gly Thr Gln Val
        115                 120                 125

Thr Val Ser Ser Leu Glu His His His His His
130                 135                 140

<210> SEQ ID NO 25
<211> LENGTH: 140
<212> TYPE: PRT
<213> ORGANISM: Artificial Sequence
<220> FEATURE:
<223> OTHER INFORMATION: VHH-EgA1 (T57K)

<400> SEQUENCE: 25

Ala Gln Val Asp Gln Leu Gln Glu Ser Gly Gly Gly Leu Val Gln Pro
1               5                   10                  15

Gly Gly Ser Leu Arg Leu Ser Cys Ala Ala Ser Gly Arg Thr Phe Ser
            20                  25                  30

Ser Tyr Ala Met Gly Trp Phe Arg Gln Ala Pro Gly Lys Gln Arg Glu
        35                  40                  45

Phe Val Ala Ala Ile Arg Trp Ser Gly Gly Tyr Lys Tyr Tyr Thr Asp
    50                  55                  60

Ser Val Lys Gly Arg Phe Thr Ile Ser Arg Asp Asn Ala Lys Thr Thr
65                  70                  75                  80

Val Tyr Leu Gln Met Asn Ser Leu Lys Pro Glu Asp Thr Ala Val Tyr
                85                  90                  95

Tyr Cys Ala Ala Thr Tyr Leu Ser Ser Asp Tyr Ser Arg Tyr Ala Leu
            100                 105                 110
```

Pro Gln Arg Pro Leu Asp Tyr Asp Tyr Trp Gly Gln Gly Thr Gln Val
          115                 120                 125

Thr Val Ser Ser Leu Glu His His His His His
          130                 135                 140

<210> SEQ ID NO 26
<211> LENGTH: 140
<212> TYPE: PRT
<213> ORGANISM: Artificial Sequence
<220> FEATURE:
<223> OTHER INFORMATION: VHH-EgA1 (T57K,K64R)

<400> SEQUENCE: 26

Ala Gln Val Asp Gln Leu Gln Glu Ser Gly Gly Gly Leu Val Gln Pro
1               5                   10                  15

Gly Gly Ser Leu Arg Leu Ser Cys Ala Ala Ser Gly Arg Thr Phe Ser
            20                  25                  30

Ser Tyr Ala Met Gly Trp Phe Arg Gln Ala Pro Gly Lys Gln Arg Glu
        35                  40                  45

Phe Val Ala Ala Ile Arg Trp Ser Gly Gly Tyr Lys Tyr Tyr Thr Asp
    50                  55                  60

Ser Val Arg Gly Arg Phe Thr Ile Ser Arg Asp Asn Ala Lys Thr Thr
65                  70                  75                  80

Val Tyr Leu Gln Met Asn Ser Leu Lys Pro Glu Asp Thr Ala Val Tyr
                85                  90                  95

Tyr Cys Ala Ala Thr Tyr Leu Ser Ser Asp Tyr Ser Arg Tyr Ala Leu
            100                 105                 110

Pro Gln Arg Pro Leu Asp Tyr Asp Tyr Trp Gly Gln Gly Thr Gln Val
        115                 120                 125

Thr Val Ser Ser Leu Glu His His His His His
    130                 135                 140

<210> SEQ ID NO 27
<211> LENGTH: 140
<212> TYPE: PRT
<213> ORGANISM: Artificial Sequence
<220> FEATURE:
<223> OTHER INFORMATION: VHH-EgA1 (T57P)

<400> SEQUENCE: 27

Ala Gln Val Asp Gln Leu Gln Glu Ser Gly Gly Gly Leu Val Gln Pro
1               5                   10                  15

Gly Gly Ser Leu Arg Leu Ser Cys Ala Ala Ser Gly Arg Thr Phe Ser
            20                  25                  30

Ser Tyr Ala Met Gly Trp Phe Arg Gln Ala Pro Gly Lys Gln Arg Glu
        35                  40                  45

Phe Val Ala Ala Ile Arg Trp Ser Gly Gly Tyr Pro Tyr Tyr Thr Asp
    50                  55                  60

Ser Val Lys Gly Arg Phe Thr Ile Ser Arg Asp Asn Ala Lys Thr Thr
65                  70                  75                  80

Val Tyr Leu Gln Met Asn Ser Leu Lys Pro Glu Asp Thr Ala Val Tyr
                85                  90                  95

Tyr Cys Ala Ala Thr Tyr Leu Ser Ser Asp Tyr Ser Arg Tyr Ala Leu
            100                 105                 110

Pro Gln Arg Pro Leu Asp Tyr Asp Tyr Trp Gly Gln Gly Thr Gln Val
        115                 120                 125

Thr Val Ser Ser Leu Glu His His His His His 130                 135                 140

<210> SEQ ID NO 28
<211> LENGTH: 140
<212> TYPE: PRT
<213> ORGANISM: Artificial Sequence
<220> FEATURE:
<223> OTHER INFORMATION: VHH-EgA1 (T57S)

<400> SEQUENCE: 28

Ala Gln Val Asp Gln Leu Gln Glu Ser Gly Gly Gly Leu Val Gln Pro
1               5                   10                  15

Gly Gly Ser Leu Arg Leu Ser Cys Ala Ala Ser Gly Arg Thr Phe Ser
            20                  25                  30

Ser Tyr Ala Met Gly Trp Phe Arg Gln Ala Pro Gly Lys Gln Arg Glu
        35                  40                  45

Phe Val Ala Ala Ile Arg Trp Ser Gly Gly Tyr Ser Tyr Tyr Thr Asp
    50                  55                  60

Ser Val Lys Gly Arg Phe Thr Ile Ser Arg Asp Asn Ala Lys Thr Thr
65                  70                  75                  80

Val Tyr Leu Gln Met Asn Ser Leu Lys Pro Glu Asp Thr Ala Val Tyr
                85                  90                  95

Tyr Cys Ala Ala Thr Tyr Leu Ser Ser Asp Tyr Ser Arg Tyr Ala Leu
            100                 105                 110

Pro Gln Arg Pro Leu Asp Tyr Asp Tyr Trp Gly Gln Gly Thr Gln Val
        115                 120                 125

Thr Val Ser Ser Leu Glu His His His His His
    130                 135                 140

<210> SEQ ID NO 29
<211> LENGTH: 140
<212> TYPE: PRT
<213> ORGANISM: Artificial Sequence
<220> FEATURE:
<223> OTHER INFORMATION: VHH-EgA1 (T57R)

<400> SEQUENCE: 29

Ala Gln Val Asp Gln Leu Gln Glu Ser Gly Gly Gly Leu Val Gln Pro
1               5                   10                  15

Gly Gly Ser Leu Arg Leu Ser Cys Ala Ala Ser Gly Arg Thr Phe Ser
            20                  25                  30

Ser Tyr Ala Met Gly Trp Phe Arg Gln Ala Pro Gly Lys Gln Arg Glu
        35                  40                  45

Phe Val Ala Ala Ile Arg Trp Ser Gly Gly Tyr Arg Tyr Tyr Thr Asp
    50                  55                  60

Ser Val Lys Gly Arg Phe Thr Ile Ser Arg Asp Asn Ala Lys Thr Thr
65                  70                  75                  80

Val Tyr Leu Gln Met Asn Ser Leu Lys Pro Glu Asp Thr Ala Val Tyr
                85                  90                  95

Tyr Cys Ala Ala Thr Tyr Leu Ser Ser Asp Tyr Ser Arg Tyr Ala Leu
            100                 105                 110

Pro Gln Arg Pro Leu Asp Tyr Asp Tyr Trp Gly Gln Gly Thr Gln Val
        115                 120                 125

Thr Val Ser Ser Leu Glu His His His His His
    130                 135                 140

<210> SEQ ID NO 30
<211> LENGTH: 140

```
<212> TYPE: PRT
<213> ORGANISM: Artificial Sequence
<220> FEATURE:
<223> OTHER INFORMATION: VHH-EgA1 (S70T)

<400> SEQUENCE: 30

Ala Gln Val Asp Gln Leu Gln Glu Ser Gly Gly Gly Leu Val Gln Pro
1               5                   10                  15

Gly Gly Ser Leu Arg Leu Ser Cys Ala Ala Ser Gly Arg Thr Phe Ser
            20                  25                  30

Ser Tyr Ala Met Gly Trp Phe Arg Gln Ala Pro Gly Lys Gln Arg Glu
        35                  40                  45

Phe Val Ala Ala Ile Arg Trp Ser Gly Gly Tyr Thr Tyr Tyr Thr Asp
50                  55                  60

Ser Val Lys Gly Arg Phe Thr Ile Thr Arg Asp Asn Ala Lys Thr Thr
65                  70                  75                  80

Val Tyr Leu Gln Met Asn Ser Leu Lys Pro Glu Asp Thr Ala Val Tyr
                85                  90                  95

Tyr Cys Ala Ala Thr Tyr Leu Ser Ser Asp Tyr Ser Arg Tyr Ala Leu
            100                 105                 110

Pro Gln Arg Pro Leu Asp Tyr Asp Tyr Trp Gly Gln Gly Thr Gln Val
        115                 120                 125

Thr Val Ser Ser Leu Glu His His His His His His
130                 135                 140

<210> SEQ ID NO 31
<211> LENGTH: 286
<212> TYPE: PRT
<213> ORGANISM: Staphylococcus aureus

<400> SEQUENCE: 31

Ala Gln Gln Asn Ala Phe Tyr Gln Val Leu Asn Met Pro Asn Leu Asn
1               5                   10                  15

Ala Asp Gln Arg Asn Gly Phe Ile Gln Ser Leu Lys Asp Asp Pro Ser
            20                  25                  30

Gln Ser Ala Asn Val Leu Gly Glu Ala Gln Lys Leu Asn Asp Ser Gln
        35                  40                  45

Ala Pro Lys Ala Asp Ala Gln Gln Asn Lys Phe Asn Lys Asp Gln Gln
50                  55                  60

Ser Ala Phe Tyr Glu Ile Leu Asn Met Pro Asn Leu Asn Glu Glu Gln
65                  70                  75                  80

Arg Asn Gly Phe Ile Gln Ser Leu Lys Asp Asp Pro Ser Gln Ser Thr
                85                  90                  95

Asn Val Leu Gly Glu Ala Lys Lys Leu Asn Glu Ser Gln Ala Pro Lys
            100                 105                 110

Ala Asp Asn Asn Phe Asn Lys Glu Gln Gln Asn Ala Phe Tyr Glu Ile
        115                 120                 125

Leu Asn Met Pro Asn Leu Asn Glu Glu Gln Arg Asn Gly Phe Ile Gln
130                 135                 140

Ser Leu Lys Asp Asp Pro Ser Gln Ser Ala Asn Leu Leu Ala Glu Ala
145                 150                 155                 160

Lys Lys Leu Asn Glu Ser Gln Ala Pro Lys Ala Asp Asn Lys Phe Asn
                165                 170                 175

Lys Glu Gln Gln Asn Ala Phe Tyr Glu Ile Leu His Leu Pro Asn Leu
            180                 185                 190

Asn Glu Glu Gln Arg Asn Gly Phe Ile Gln Ser Leu Lys Asp Asp Pro
```

```
                195                 200                 205
Ser Gln Ser Ala Asn Leu Leu Ala Glu Ala Lys Lys Leu Asn Asp Ala
    210                 215                 220

Gln Ala Pro Lys Ala Asp Asn Lys Phe Asn Lys Glu Gln Gln Asn Ala
225                 230                 235                 240

Phe Tyr Glu Ile Leu His Leu Pro Asn Leu Thr Glu Glu Gln Arg Asn
                245                 250                 255

Gly Phe Ile Gln Ser Leu Lys Asp Asp Pro Ser Val Ser Lys Glu Ile
                260                 265                 270

Leu Ala Glu Ala Lys Lys Leu Asn Asp Ala Gln Ala Pro Lys
                275                 280                 285
```